(12) United States Patent
May et al.

(10) Patent No.: US 8,157,176 B2
(45) Date of Patent: Apr. 17, 2012

(54) MODULAR MARKING APPARATUS AND METHOD

(75) Inventors: Gregory J. May, Corvallis, OR (US);
Anthony D. Studer, Albany, OR (US);
Gary G. Lutnesky, Corvallis, OR (US);
Kevin E. Swier, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 353 days.

(21) Appl. No.: 11/755,527

(22) Filed: May 30, 2007

(65) Prior Publication Data

US 2008/0296391 A1 Dec. 4, 2008

Related U.S. Application Data

(63) Continuation-in-part of application No. PCT/US2007/012431, filed on May 25, 2007.

(51) Int. Cl.
*G06K 7/10* (2006.01)

(52) U.S. Cl. .......... 235/472.01; 235/375; 235/432; 235/454; 235/462.14; 235/462.15; 235/462.22; 235/462.45; 235/462.47; 235/472.02; 347/109; 400/193

(58) Field of Classification Search .......... 235/375, 235/432, 454, 462.14, 462.15, 462.22, 462.45, 235/462.47, 472.02; 347/109; 400/193
See application file for complete search history.

(56) References Cited

U.S. PATENT DOCUMENTS

| | | | |
|---|---|---|---|
| 4,180,204 A | 12/1979 | Koenig et al. | |
| 4,377,741 A | 3/1983 | Brekka et al. | |
| 4,523,235 A | 6/1985 | Rajchman | |
| 4,574,317 A | 3/1986 | Scheible | |
| 4,716,291 A | 12/1987 | Sakamoto et al. | |
| 4,947,262 A | 8/1990 | Yajima et al. | |
| 5,012,349 A | 4/1991 | de Fay | |
| 5,021,641 A * | 6/1991 | Swartz et al. | 235/462.36 |
| 5,049,999 A | 9/1991 | Stemmle | |
| 5,079,639 A | 1/1992 | Mochinaga | |
| 5,124,801 A | 6/1992 | Shinmura et al. | |
| 5,130,847 A | 7/1992 | Tsujioka | |
| 5,227,617 A | 7/1993 | Christopher et al. | |
| 5,264,947 A | 11/1993 | Nishikawa et al. | |
| 5,311,208 A | 5/1994 | Burger et al. | |
| 5,340,971 A | 8/1994 | Rockstein et al. | |
| 5,369,262 A | 11/1994 | Dvorkis et al. | |
| 5,382,779 A | 1/1995 | Gupta | |
| 5,446,559 A | 8/1995 | Birk | |
| 5,483,624 A | 1/1996 | Christopher et al. | |
| 5,519,198 A * | 5/1996 | Plesko | 235/462.4 |
| 5,532,467 A | 7/1996 | Roustaei | |
| 5,594,838 A | 1/1997 | Christopher et al. | |
| 5,595,445 A | 1/1997 | Bobry | |
| 5,602,377 A | 2/1997 | Beller et al. | |
| 5,805,779 A | 9/1998 | Christopher et al. | |
| 5,825,010 A | 10/1998 | Charych et al. | |
| 5,825,995 A * | 10/1998 | Wiklof et al. | 358/1.18 |
| 5,833,800 A | 11/1998 | Goodwin et al. | |

(Continued)

OTHER PUBLICATIONS

Monarch Marking Systems, Inc, "Monarch 6015 Printer, Programmer's Manual", TC6015PM Rev. AC 2/01, 1999.*

(Continued)

*Primary Examiner* — Daniel Hess
*Assistant Examiner* — Michael Andler

(57) ABSTRACT

Various embodiments relating to a modular marking apparatus and method are disclosed.

25 Claims, 4 Drawing Sheets

U.S. PATENT DOCUMENTS

| | | | |
|---|---|---|---|
| 6,129,276 | A | 10/2000 | Jelen et al. |
| 6,164,546 | A * | 12/2000 | Kumagai et al. ......... 235/472.01 |
| 6,179,444 | B1 * | 1/2001 | Plesko ........................ 362/259 |
| 6,203,221 | B1 | 3/2001 | Tomasik et al. |
| 6,206,288 | B1 | 3/2001 | May et al. |
| 6,229,565 | B1 | 5/2001 | Bobry |
| 6,347,743 | B2 | 2/2002 | Wilz, Sr. et al. |
| 6,415,982 | B2 | 7/2002 | Bridgelall et al. |
| 6,505,776 | B1 | 1/2003 | Wilz, Sr. et al. |
| 6,565,005 | B1 | 5/2003 | Wilz et al. |
| 6,567,126 | B1 | 5/2003 | Slatter et al. |
| 6,618,078 | B1 | 9/2003 | Budrys |
| 6,644,549 | B1 | 11/2003 | Swartz |
| 6,652,170 | B1 * | 11/2003 | Arnold ........................... 400/88 |
| 6,688,526 | B2 | 2/2004 | Metlitsky et al. |
| 6,712,112 | B2 | 3/2004 | Goodwin et al. |
| 6,714,969 | B1 | 3/2004 | Klein et al. |
| 6,736,315 | B2 | 5/2004 | Swartz |
| 6,773,177 | B2 | 8/2004 | Denoue et al. |
| 6,820,809 | B2 | 11/2004 | Juntunen |
| 6,910,633 | B2 | 6/2005 | Swartz et al. |
| 6,916,128 | B1 * | 7/2005 | Petteruti et al. ................. 400/88 |
| 6,952,880 | B2 | 10/2005 | Saksa |
| 6,991,332 | B1 | 1/2006 | Fan et al. |
| 7,133,168 | B2 | 11/2006 | Cheung et al. |
| 7,136,183 | B2 | 11/2006 | Silverbrook et al. |
| 7,140,792 | B2 * | 11/2006 | Silverbrook .................... 400/88 |
| 7,273,179 | B2 * | 9/2007 | Anson et al. ............. 235/462.46 |
| 7,337,257 | B2 * | 2/2008 | Landron et al. ............... 710/304 |
| 2002/0024542 | A1 | 2/2002 | Ericson et al. |
| 2002/0171693 | A1 | 11/2002 | Murray |
| 2003/0037448 | A1 | 2/2003 | Saksa |
| 2003/0098897 | A1 | 5/2003 | Hoshino et al. |
| 2004/0109034 | A1 | 6/2004 | Brouhon |
| 2005/0167507 | A1 | 8/2005 | Swartz et al. |
| 2008/0129532 | A1 * | 6/2008 | Bellows ........................ 340/825 |

OTHER PUBLICATIONS

Symbol Technologies, Inc., "SPT 1500", Part No. EA, Jun. 2000.*
Symbol Technologies, Inc., "SPT 1500 Product Reference Guide", 70-33757-01, Revision A-Jul. 1998.*
Migatron Corp., Ultrasonic Detections and Control Applications, http://www.migatron.com/apps.htm, Nov. 10, 2006, Woodstock, IL.
Picatinny 1913 Rail Specifications, http://www.biggerhammer.net/picatinny, May 8, 2007.

* cited by examiner

MODULAR MARKING APPARATUS AND METHOD

CROSS-REFERENCE TO RELATED PATENT APPLICATIONS

This application is a continuation-in-part of, and claims priority under 35 USC 365(c) from, International Application No. PCT/US 2007/012431, filed May 25, 2007 by Anthony D. Studer, Sang O. Bradley, Raymon D. Burrows, Mark S. Giordono, Dennis A. Iverson, William E. Lewey, Gary G. Lutnesky, Andreas H. Queisser, Dennis T. So and Kevin E. Swier and entitled IDENTIFYING SENSOR AND PRINT DEVICE, the full disclosure of which is hereby incorporated by reference. The present application is related to co-pending U.S. patent application Ser. No. 11/669,149 filed on Jan. 30, 2007 by Gary G. Lutnesky et al and entitled PRINT DEVICE PRECONDITIONING, the full disclosure of which is hereby incorporated by reference.

BACKGROUND

Devices are sometimes differently configured depending upon specific characteristics of a job or specific characteristics of a person using the device. Providing such different devices or differently configuring a device may be difficult and time-consuming.

DETAILED DESCRIPTION OF THE EXAMPLE EMBODIMENTS

Figure 1:
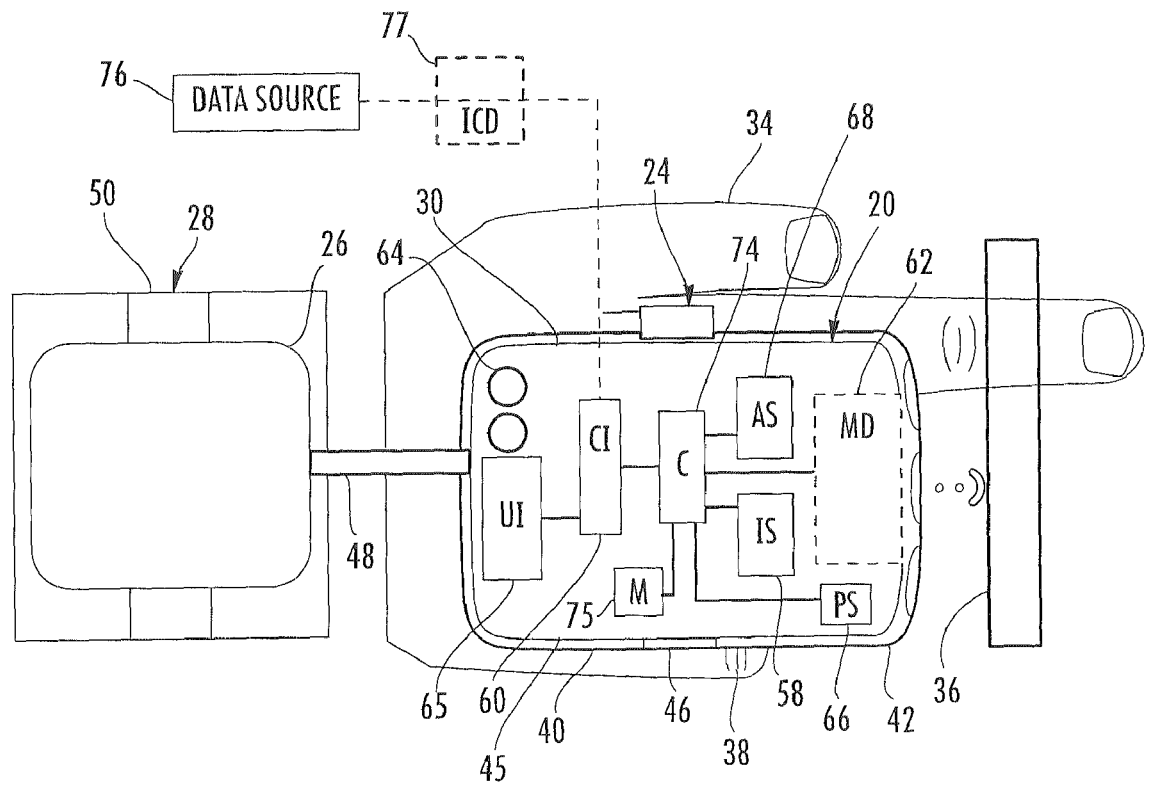
FIG. 1 is a top plan view schematically illustrating a modular marking system according to an example embodiment.
Figure 2:
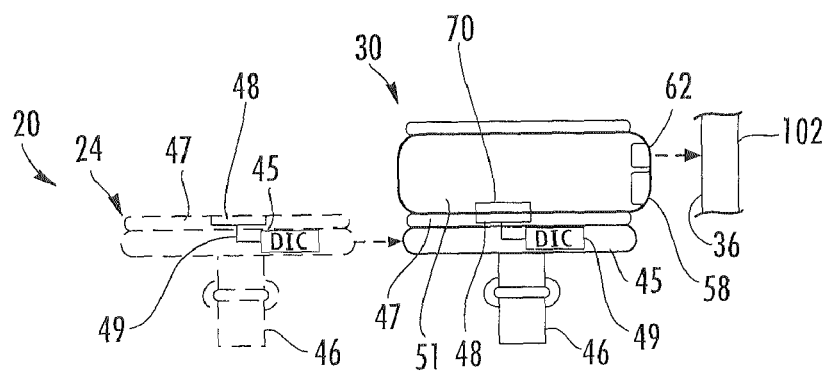
FIG. 2 is a side elevational view illustrating another particular embodiment of the system of FIG. 1 according to an example embodiment.

FIGS. 1 and 2 schematically illustrate modular marking system 20 according to an example embodiment. System 20 is configured to print an image onto a surface while the system is being manually moved relative to the surface being printed upon or while the system is held or mounted in a stationary fashion as the surface being printed upon is moved relative to and external to system 20 during printing. System 20 includes a unit 30 configured to print or mark a medium and to be releasably connected to one or more additional modules. Such modules include digital identification codes, wherein unit 30 reconfigures itself based upon the digital identification codes. As a result, system 20 reconfigures itself to adapt to specific characteristics of a job or specific characteristics of a person using system 20.

System 20 includes mounting module 24, power supply 26, mounting system 28 and data capture and printing unit 30. Mounting module 24 comprises an arrangement or mechanism configured to mount unit 30 to a top or backside of a hand 34 of a user. Mounting module 24 facilitates positioning and orientation of unit 30 with respect to one or more surfaces while freeing the user's hand 34 for additional tasks such as grasping and carrying articles or providing manual input with the user's fingers or palm to one or more controls or manual interfaces. In the example embodiment shown, mounting module 24 removably supports unit 30 substantially over one or more proximal phalanxes 38. In the example illustrated, mounting module 24 removably supports unit 30 substantially between metacarpophalangeal joints 40 (also known as the knuckles) and proximal interphalangeal joints 42 (the finger joints closest to the knuckles) of the hand 34 of the user. As will be described hereafter with respect to FIG. 3, such a mounting arrangement provides extra degrees articulation and added printing flexibility. In addition, printing or data capture can be completed in an efficient, naturally intuitive linear or arcuate manual motion provided by the user In the particular embodiment illustrated, mounting module 24 includes a base 45 and a strap 46. Base 45 comprises a floor, platform, shelf or panel supporting unit 30. In one embodiment, base 45 includes grooves 47 which slidably receive tongues 49 associated with the housing or casing 51 of unit 30. In another embodiment, base 45 may include tongues 49 while housing or casing 51 includes grooves 47. In another embodiment, base 45 is configured to releasably snap into connection with the housing or casing 51 of unit 30. In still other embodiments, base 45 may be configured to cooperate with unit 230 to facilitate releasable connection to unit 30 in other manners.

Strap 46 comprises one or more members configured to extend from unit 30 and to wrap about the hand 34. For example, in one embodiment, strap 46 may have opposite ends releasably coupled to one another by a hook and loop fastener (VELCRO). In another embodiment, such ends may be releasably connected to one another by snaps, clasps, buckles and the like.

Because module 24 is configured to be removably mounted to unit 30, unit 30 may be used independently of mounting system 24 or may be used with other mounting systems. For example, unit 30 may be alternatively grasped between the thumb and fingers of a person while being manually held. The removable nature of mounting system 24 further facilitates repair and replacement of either mounting system 24 or unit 30. In yet other embodiments, mounting module 24 may include other supports such as a handle or a stationary support such as a clamp or bracket.

For purposes of this disclosure, the term "releasably" means that two structures may be disconnected and physically separated from one another without permanent deformation or damage to either of the structures. For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members.

In the embodiment illustrated, mounting module 24 extends about substantially an entire width of hand 34. In the embodiment illustrated, mounting module 24 extends about all four fingers of hand 34. In yet other embodiments, mounting module 24 may extend about fewer of such fingers or a smaller portion of hand 34. For example, in other embodiments, mounting module 24 may extend about a person's middle finger and index finger. In other embodiments, mounting module 24 may extend about a person's middle finger, index finger and ring finger. In other embodiments, mounting module 24 may alternatively extend over hand 34 and be substantially received between the person's wrist and knuckles.

As schematically shown by FIG. 2, mounting module 24 additionally includes communication interface 48 and digital identification code 49. Communication interface 48 comprises a device configured to facilitate the transmission of digital identification code 49 to unit 30 or the reading of digital identification code 49 by unit 30. In one embodiment, communication interface 48 include sets of electrical contacts, such as electrically conductive pins, pads or receptacles configured to make individual electrical interconnection with corresponding electrical contacts or interconnects of an opposite communication interface of unit 30. In other embodiments, communication interface 48 may have other configurations.

Digital identification code 49 comprises a digital code stored or otherwise provided on module 24 that when read by unit 30 or transmitted to unit 30 assists in configuring unit 30. In one embodiment, digital identification code 49 may be embodied in a persistent storage device or memory associated with module 24. For example, in one embodiment, a memory may include one or more bits or bytes forming the digital identification code. In another embodiment, digital identification code 49 may be embodied by one or more shorted pins or pads provided on communication interface 48.

Digital identification code 49 assists in the configuring of unit 30. Digital identification code 49 includes configuring instructions for unit 30. Such instructions may identify characteristics of module 24 that is connected to unit 30 such a unit 30 may appropriately configure itself to use features of module 24. For example, in one embodiment, digital identification code may be part of a coding identification scheme, wherein each accessory or module is assigned a class identification, a type identification and a feature identification. In one embodiment, this scheme may be implemented using six bit locations. In other embodiments, other schemes may be developed. In one embodiment, such bits are provided with electrical shorts or switches. In another embodiment, full memory may be used to provide such bit locations. The following is an example of an identification scheme.

| CLASS 00-11 | TYPE 00-11 | FEATURES 00-11 |
|---|---|---|
| 00 (Reserved for Future Accessory) | 00 01 10 11 | 00 01 10 11 |
| 01 Input | 00 No module 01 CCD Scanner module 10 Laser Scanner | 00 default 01—decode barcode, 10—RAW image capture |

-continued

| CLASS 00-11 | TYPE 00-11 | FEATURES 00-11 |
|---|---|---|
| | 11 Workstation. | 11—pass through data (do not decode) |
| 10 Mounting | 00 No module 01 Back of hand 10 Handle 11 Workstation | 00—auto trigger, −10 tilt 01—auto trigger, +15 tilt 10—manual trigger, −10 tilt 11—manual trigger, +15 tilt |
| 11 Output | 00 No module 01 Serial 10 USB 11 Wireless 12 Etc. | 00—default 01—slow speed (9600, 802.11 b 10—high speed (56 Kb, 802.11 g) 11—reserved |

In the above example identification scheme, there are three classifications of modules: (1) "input" identifying modules where information or data is input or captured by the module, (2) "mounting" identifying modules by which unit 30 is manipulated or supported and (3) "output" identifying modules which facilitate transfer of data from unit 30. Each module classification has one or more types. For example, a mounting module may comprise a back of hand mount or a handle mount. Each type of module may have one or more associated features. For example, a handle mount may include a manual trigger for initiating printing or initiating sensing or may employ an automatic trigger for one or both of such activities. The coding/identification scheme indicates to unit 30 what features and capabilities are provided by the particular attached module. Unit 30 configured itself based upon such features or capabilities.

In the example illustrated, module 24 may include a digital identification code 49 comprising a six bit identification code, wherein the first two digits are "10" indicating that module 24 is a mounting class module and wherein the second two bits are "01" indicating that module 24 is a back of hand type mounting module. The last two bits could be assigned a value associated with the feature wherein mounting module 24 omits a trigger. Other modules mountable to unit 30 would have other digital identification codes 49 depending upon their classification, type and features.

Digital identification code 49 may additionally or alternatively include assigned values associated with customized settings or parameters for a particular user or a particular job or workstation to which the module may be assigned. For example, digital identification code 49 may have additional bits reserved for either directly providing such customized settings or parameters or for addressing or linking to customized settings or parameters which may be stored in unit 30 or external to both the module and unit 30. In one embodiment, digital identification code 49 may identify a particular user or have an value that is assigned to a particular user. Upon receiving digital identification code 49, unit 30 may configure itself based upon the particular user as identified from the module attached to unit 30. For example, upon receiving digital identification code 49 having a value assigned to a first user, unit 30 may consult a database or lookup table (provided as part of unit 30, provided by data source 76 or intermediate communication device 77) having one or more parameters pre-assigned to the first user or the first user's identification code 49. Examples of such parameters may include ergonomic parameters, such as a tilt angle or other orientations, for indicating when unit 30 is to begin or initiate sensing of data. In such a manner, the attachment of different mounting modules may automatically result in different tilt angles or other ergonomic adjustments based upon the type mounting module attached or based upon ergonomic preferences for different users.

Such parameters may additionally include preferences for the first user such as whether the first user prefers a crosshair or other aiming light to be on or off, whether the first user prefers that an identifying sensor illumination to be on or off, the loudness or volume of an acknowledging audible indicator a preferred code capture length (the time provided to unit 30 to sense or capture identifying information), or particular printing preferences for the first user such as whether printing is in a monochromatic mode or a color mode, or print parameters such as font or format. Such parameters may also include a first user's preferences for feedback such as whether such feedback is provided visually or audibly.

In yet other embodiments in which a particular module is assigned to a particular workstation, work environment or task, module 24 may include a digital identification code 49 associated with pre-assigned parameters for system 20 to be used at the particular workstation, work environment or task. One example of a different task might be printing on tops of boxes overhead versus printing on sides of boxes out in front of a user. The different orientations of the surfaces being printed upon may benefit from having different operational parameters such as different tilt angles. One task may utilize a first set of printing parameters (font, resolution, color) while another task utilizes a second set of printing parameters. Likewise, different identifying sensors may incorporate technologies such that they are able to capture many different types of identifying data or symbologies, or read identifying information from devices with varying formats or ranges. These types of modules may be used to provide flexibility with respect to the overall work environment, but then it is desirable to optimize them with respect to particular jobs. For example, an identifying sensor module may be able to capture, 1D, 2D and data matrices, but for a particular job or area, only one type of code must be captured. Consequently, for optimization purposes, one parameter associated with a particular job may be the type of symbology read by the identifying sensor.

In particular embodiments, digital identification code 49 may be associated with multiple sets, options or choices for a particular user and from which the particular user may select or choose an individual set, option or choice. For example, a digital identification code 49 may be associated with multiple alternative parameters associated with a user assigned to a module. Upon detecting the digital identification code when the module is attached to unit 30, unit 30 presents the multiple options or choices to the particular user. Presented with such options, the user may select one or more of the options or may be given an opportunity for modifying one or more of the presented parameters or settings. The user may also select one of the sets of one or more parameter settings as a default set.

Such multiple options or sets of parameters or settings may be different sets of ergonomic settings, may be different sets of operational preferences for a single task or may be different sets of operational parameters for different tasks that the particular user may perform. For example, a user may perform three distinct tasks or jobs during a work day, week or period of time. Digital identification code 49 may instruct unit 32 to present three distinct operational parameters, wherein each set of operational parameters corresponds to a distinct task. Depending upon the task about to be performed by the particular user, the user may then select one of the operational parameter sets. A second distinct user may perform different tasks. In such a scenario, the digital identification code 49 associated with the second user may direct unit 30 to present different sets of parameters or settings to the second user for selection.

The digital identification code 49 may either directly provide the parameter or may link to or address an external memory, data base or lookup table including more detailed parameter information assigned to the particular digital identification code 49. For example, in one embodiment, for a particular task, it may be desirable to print a label or other information upon a surface with a selected color, selected font and the like. The particular module for use in performing the particular task, such as module 24, may have a digital identification code 49 including such print parameters or linking unit 30 to such print parameters. When unit 30 is located in the particular work environment for use in performing the noted task and is attached to the particular module, unit 30 automatically reconfigures itself based upon the digital identification code 49 provided by the module. Thus, a single unit 30 may be relocated to different environments or used to perform different tasks and is automatically configured or adjusted to accommodate preferences with a particular task or work environment without substantial user interaction. The user configuration data can be stored locally in the unit, or remotely at the host system and the configuration data pulled when needed to configure a new unit to the current owner's or user's last stored preferences Likewise, digital identification code 49 may be used in conjunction with other hardware and applications in the work environment so that device 30 and its associated components are restricted based on physical location. Device 30 may include a GPS module such that an alarm is sounded if it is taken outside of a physically defined area.

In still other embodiments, digital identification code 49 may comprise an authorization code for accessing an external database. For example, certain users or certain modules may be authorized to access data from selected databases. Digital identification code 49 may serve as a key for providing or denying access to such databases (local or remote) depending upon what particular module is connected to unit 30 or what particular user and his or her associated module is attached to unit 30. Likewise, digital identification code 49 may be used to associate a particular device, with a particular user working in a particular job such that performance metrics can be collected and used for optimization purposes, or to automate processes such as keeping track of a worker's hours or days they worked.

Power supply 26 comprises a source of power for unit 30. In the particular example illustrated, power supply 26 is separate and distinct from unit 30 and is electrically connected to unit 30 by a cord or cable 48. In one embodiment, power supply 26 comprises one or more batteries. In other embodiments, power supply 26 may comprise an interface with a Universal Serial Bus (USB) port or an electrical outlet. In yet other embodiments, power supply 26 may alternatively be provided as part of unit 30 or may be directly and releasably connected to unit 30. In such an alternative embodiment, mounting system 28 may be omitted.

Mounting system 28 comprises a device or mechanism configured to releasably secure power supply 26 to an arm of a person, such as a forearm of the person using unit 30. In other embodiments, mounting system 28 may be configured to support power supply 26 at other locations such as along an upper arm of the person or about a waist of the person. In the particular example illustrated, mounting system 28 includes a belt or strap 50 configured to wrap about an anatomy of the person, such as a forearm of the person. For example, in one embodiment, strap 50 may have opposite ends releasably connected to one another by a hook and loop fastener (VEL- CRO). In another embodiment, such ends may be releasably connected to one another by snaps, clasps, buckles and the like. As noted above, in other embodiments, mounting system 28 may be omitted.

Data capture and printing unit 30 comprises a single self-contained arrangement of components or one or more self-contained modules that include the components and that are releasably connected to one another to provide communication between such components, wherein the components cooperate to facilitate sensing and data capture from a first identifier, such as from a identifying image (for example, a barcode) and to print a second distinct image based upon the data captured from the first identifier. For purposes of this disclosure, when two images are described as being "distinct" from one another, such as when an identifier is an image, it shall mean that such two images have different combinations, layouts or arrangements of one or more alphanumeric symbols, text, graphics or other visible elements. A first image that varies from a second image solely in proportion (an enlargement or reduction) or solely in color, shade, or darkness is not a "distinct" image. Copies, whether enlarged or reduced or printed in different color, resolution or darkness levels are not "distinct" images.

Data capture and printing unit 30 includes identifying sensor 58, communication interface 60, marking device 62, ready indicators 64, user interface 65, print sensor 66, auto sensor 68, communication interface 70 and controller 74. Identifying sensor 58 comprises a component of unit 30 configured to sense, scan or capture data from a first identifier upon a surface. In one embodiment, identifying sensor 58 comprises an imager and one or more illumination sources, such as targeted light emitting diodes, facilitating omni-directional scanning in lowlight conditions. In one embodiment, identifying sensor 58 is additionally configured to emit a crosshair or other targeting light or image upon the surface to be sensor scanned. As a result, a person can visually verify whether identifying sensor 58 is appropriately aimed for sensing identification information from a surface. In other embodiments, identifying sensor 58 may comprise other device configured to sense or capture data from a visible image such as a two dimensional (2D) charge coupled device (CCD) or other forms of a camera and the like. In still other embodiments, identifying sensor 58 may utilize ultraviolet or infrared light to scan or sense any image or data from an image on a surface. For example, identifying sensor 58 may comprise a laser scanner or a radio frequency identification device (RFID) reader, wherein the identifier is an RFID tag. Identifying sensor 58 may be configured to read a code such as a Maxi code, bar code, Universal Product Code (UPC) and the like.

Communication interface 60 comprises a component of unit 30 configured to communicate with external electronic devices. Communication interface 60 is configured to transmit data as well to receive data. In one embodiment, communication interface 60 is configured to communicate wirelessly with external electronic devices. For example, in one embodiment, communication interface 60 may communicate with radio waves such as with a wireless IEEE 802.11g module. In other embodiments, communication interface 60 may communicate with ultraviolet or infrared light. In still other embodiments, communication interface 60 may be a wired connection, wherein communication occurs through electrical or optical cables. For example, in one embodiment, communication interface 60 may comprise a Universal Serial Bus (USB) port.

As shown by FIG. 1, in one embodiment, communication interface 60 is configured to communicate with a data source 76. Data source 76 comprises a device external to unit 30 configured to receive data from unit 30, to analyze or interpret the captured image or data and to transmit printing instructions to unit 30 that are based at least in part upon the interpreted image or data and the information that it represents. In one embodiment, data source 76 may comprise a communications access point, a data server or other data processing and communication device. In yet other embodiments, data source 76 may be omitted where data source 76 is incorporated as part of unit 30. In other embodiments where data source 76 is incorporated into unit 30, communication interface 60 may also be omitted.

As further shown by broken lines in FIG. 1, in one embodiment, system 20 may additionally include an intermediate communication device 77. Intermediate communication device 77 may intercede between data source 76 and unit 30 by analyzing data or information from unit 30 and transmitting such data to data source 76 and/or by analyzing instructions from data source 76 and modifying or transmitting such instructions to unit 30. Intermediate communication device 77 may reduce the processing power used by unit 30. In one embodiment, intermediate communication device 77 communicates with unit 30 in a wireless fashion. In another embodiment, intermediate communication device 77 may be wired to unit 30 by an electrical or optical cable. In one embodiment, intermediate communication device 77 is configured to be supported on another portion of a person's anatomy other than hand 34. For example, in one embodiment, intermediate medication device 77 may be a waist supported device.

Marking device 62 comprises a device configured to print, paint, mark or form an image, pattern or coating upon a surface, or to indent, scratch, scribe or alter a surface, such as surface 36. In one embodiment, marking device 62 is configured to deposit a fluid printing material or solution. Examples of printing materials include, but are not limited to, embossing powder, clear ink, white out correction fluid, invisible ink, medicaments or lotions, glues, dry erase inks and the like. In one embodiment, marking device 62 may comprise one or more drop-on-demand inkjet print heads. For example, marking device 62 may comprise one or more thermal resistance drop-on-demand inkjet print heads (fluid-ejection mechanisms) or may alternatively comprise one or more piezo electric drop-on-demand print heads (fluid-ejection mechanisms). In yet other embodiments, marking device 62 may comprise other printing components.

Indicators 64 comprise components of unit 30 configured to communicate information regarding the status of unit 30. In one embodiment, indicators 64 are configured to communicate information to a person using visible or audible signals or displays. For example, in one embodiment, indicators 64 are configured to provide an indication of one or more of the following events: (1) when identifying sensor 58 is in sufficiently close proximity to surface 36 for sensing an image upon surface 36, (2) when an image has been sensed by identifying sensor 58, (3) when printing instructions have been received from data source 76, (4) when marking device 62 is ready for printing, (5) when unit 30 is in sufficient proximity to a surface, such as surface 36, for printing, (6) when sensing of identification information has been completed and (7) when printing or marking has been completed. In other embodiments, other events may be indicated. For example, one embodiment for indicator 64 may consist of a visible indicator such as one or more light emitting diodes, an audible indicator or combinations thereof. In yet other embodiments, indicators 64 may be omitted.

User interface 65 comprises an interface by which a person may enter commands establishing one or more operational modes for unit 30. For example, user interface 65 may permit a user or person to set printing settings, such as fonts, color and the like or settings for identifying sensor 58 or auto sensor 68. User interface 65 may also be utilized to enter commands instructing controller 74 to consult particular databases for printing instructions or images to be printed upon sensed or captured data. In particular embodiments, user interface 65 may be utilized to permit a user to enter a manual input initiating both the capture of data with identifying sensor 58 as well as a subsequent printing of an image with marking device 62.

Print sensor 66 comprises a sensing device or component associated with identifying and printing unit 30 that is configured to detect relative movement of unit 30, and in particular, marking device 62, relative to a surface being printed upon, such as surface 36. Signals from print sensor 66 indicate the relative speed at which marking device 62 is moving relative to the surface being printed upon. Signals from print sensor 66 are used by controller 74 to control the rate at which printing material is discharged from marking device 62 and which particular nozzles print materials are being discharged to form an image. In the particular embodiment illustrated, print sensor 66 is further configured to determine when marking device 62 is in contact or is sufficiently close to surface 36 for the initiation of printing. In other embodiments, the initiation of printing may alternatively begin in response to actuation of a separate trigger. According to one embodiment, print sensor 66 may comprise an encoder wheel and associated encoder, wherein the encoder wheel is either rotated along a surface being printed upon or moved laterally by pressure against the surface. In other embodiments, print sensor 66 may comprise a navigational sensor or other sensing devices.

Auto sensor 68 comprises a component of the identifying and print unit 30 configured to sense an image separation distance between the surface having an image and sensor 68 or identifying sensor 58. According to one embodiment, sensor 68 detects the image separation distance without contacting surface 36. In one embodiment, sensor 68 comprises an ultrasonic circuit or sensor. One example of such an ultrasonic Sensor is a 400ET080 Piezoelectric Sensor, commercially available from Pro-Wave Electronics Corp. located at $3^{rd}$ Floor, No. 4, Lane 348, Section 2, Chung Shan Road, Chung Ho City, Taipei Hsien, Taiwan 235. In other embodiments, sensor 68 may comprise other ultrasonic sensors or may comprise other non-contact sensors such as infrared sensors. In still other embodiments, sensor 68 may comprise a sensor which contacts surface 36 when determining in the image separation distance.

Communication interface 70 (shown in FIG. 2) comprises a device configured to facilitate the transmission of digital identification code 49 to unit 30 or the reading of digital identification code 49 by unit 30. In one embodiment, communication interface 70 include sets of electrical contacts, such as electrically conductive pins, pads or receptacles configured make individual electrical interconnection with corresponding electrical contacts or interconnects of an opposite communication interface 48 of a module, such as module 24. In other embodiments, communication interface 70 may not utilize a physical connection for reading digital identification code 49, or may have other configurations. For example, unit 30 may be designed such that it includes an RFID reader as the identifying sensor, in place of or in addition to communication interface 70. In this case, digital identification code 49 may be configured to be read by an RFID reader. Unit 30 may be configured such that its RFID reader can be used to wirelessly read the digital identification code from one or more modules.

Controller 74 comprises one or more processing units physically associated with identifying and print unit 30 and is configured to generate control signals directing operation of identifying sensor 58 and marking device 62. For purposes of this application, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, controller 74 may be embodied as part of one or more application-specific integrated circuits (ASICs). Unless otherwise specifically noted, the controller is not limited to any specific combination of hardware circuitry and software, nor to any particular source for the instructions executed by the processing unit.

In operation, mounting module 24 is releasably connected to unit 30. In the example shown, such connection is facilitated by grooves 47 and tongues 49. In other embodiments, such releasable connection may be facilitated by other releasable connecting mechanisms. During such connection, interfaces 48 and 70 are brought into communicating engagement or contact with one another. As a result, controller 74 senses or otherwise reads digital identification code 49 from module 24. For example, in one embodiment, controller 74 reads the six bit digital identification code indicating that module 24 is a mounting module, is a back of hand mounting module and has selected features. Based upon this information, controller 74 configures itself so as to utilize the features provided by module 24. In one embodiment in which digital identification code 49 include other information such as user or task identification information, controller 74 additionally configures unit 30 such the unit 30 operates in a customized fashion accommodating ergonomic or operational preferences of a particular user or operational parameters selected for a particular task. Upon such configuring, system 20 is ready for use.

Upon configuration of unit 30, which is supported by hand 34, system 20 is manually positioned and oriented in sufficiently close proximity to surface 36 while identifying sensor 58 is moved across a first identifier so as to capture data from the sensed first identifier. The initiation of sensing of the identifier by identifying sensor 58 is triggered in response to signals from auto sensor 68 indicating an appropriate identifier separation distance. In another embodiment, the initiation of sensing of the identifier may be indirectly initiated in response to a manual triggering event entered via user interface 65. For purposes of this disclosure, a "manual triggering event" means depressment or movement of a control button, switch, lever or other movable control input structure by a person's fingers or thumb being placed in direct contact with the movable control input. Identifying sensor 58 transmits signals representing the sensed or captured identifier data or information from surface 36 to controller 74.

Using the captured data, controller 74 generates control signals directing marking device 62 to print a second distinct image upon the same surface 36 or upon another surface. In one embodiment, controller 74 transmits the captured data to an external data source 76 using communication interface 60 and receives printing instructions from data source 76 via communication interface 60. Controller 74 either directly passes through such instructions to marking device 62 or uses such instructions to generate control signals for directing marking device 62. In another embodiment, controller 74 may analyze the captured data using a database of information contained in memory 75 without consulting an external data source 76. For example, the previously described functions of data source 76 may alternatively be performed by unit 30. Upon marking device 62 being appropriately positioned with respect to the surface 36 to be printed upon, marking device 62 prints a second distinct image.

In the embodiment illustrated, marking device 62 initiates printing of the second image in response to control signals from controller 74 which are based upon signals from print sensor 66 indicating appropriate positioning of marking device 62 with respect to surface 36. For example, marking device 62 may initiate printing upon print sensor 66 being brought into contact with surface 36. In another embodiment, marking device 62 may initiate printing of the second image upon receiving control signals from controller 74 which are based upon a manual triggering event received via user interface 65. In yet another embodiment, marking device 62 may initiate printing of the second image in response to control signals from controller 74 which are based upon or in response to signals from auto sensor 68 indicating appropriate positioning of unit 30 relative to surface 36 for the initiation of printing.

Overall, modular marking system 20 facilitates efficient and less time-consuming data capture and printing or other marking. Because system 20 employs a single unit 30 that performs both (1) identifier sensing or data capture and (2) marking or printing, both operations may be performed without having to exchange or acquire separate units. Because unit 30 of system 20 is mounted on a back of hand 34, unit 30 may be more easily controlled and positioned with respect to the surface to be scanned and printed upon. As the same time, the user's fingers are free to perform other tasks when system 20 is not being used. Consequently, the user does not need to repeatedly grasp unit 30 to use unit 30 and does not need to set unit 30 down when unit 30 is not being used.

Because unit 30 automatically initiates both the capturing or sensing of a first identifier or it's data using identifying sensor 58 and the printing or marking of a second distinct image using marking device 62 in response to no greater than one manual triggering event, efficiency is enhanced. In one embodiment, a single manual trigger event initiates the capturing of data from the first identifier, wherein printing is automatically initiated in response to signals from print sensor 66. In one embodiment, a single manual trigger event indirectly initiates the capturing of data from the first identifier.

In another embodiment, the capturing of data from the first identifier is automatically initiated in response to signals from auto sensor 68, wherein the initiation of printing is initiated in response to a single manual triggering event. In the particular example illustrated, the initiation of the capturing of a first identifier or data of the first identifier using identifying sensor 58 is in response to signals from auto sensor 68 and the initiation of printing of the second image is in response to signals from print sensor 66. In such an embodiment, no manual triggering events are used. By reducing or eliminating manual triggering events, the capturing of data and the printing of an image based upon such captured data may be performed in less time. For example, a user may not have to repeatedly depress or move a movable control input each time a first identifier is to be scanned or sensed or each time a second image is to be printed or marked. As a result, system 20 is well adapted for high-speed product or article labeling or providing labeling updates.

Figure 3:
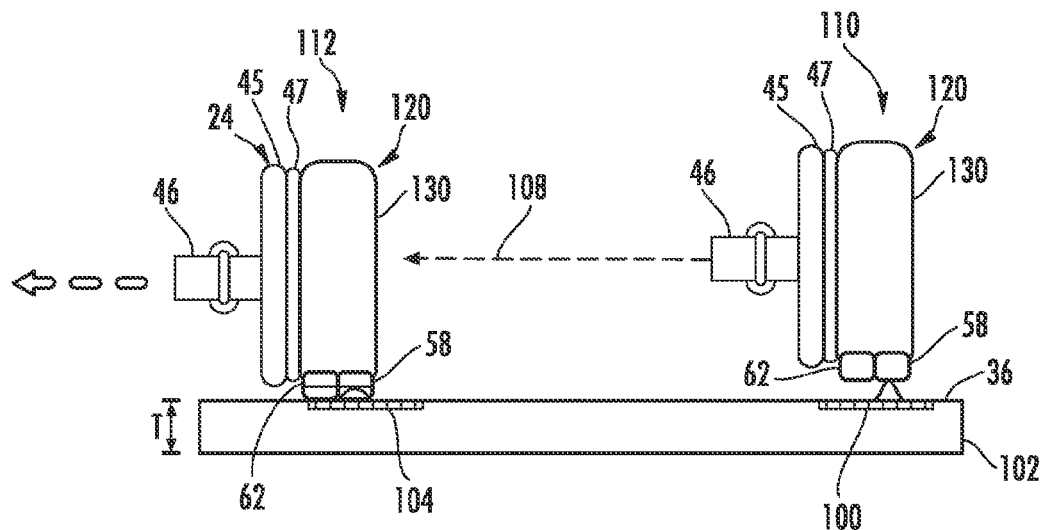
FIG. 3 is a side elevational view illustrating a particular embodiment of the system of FIG. 1 during data capture and printing according to an example embodiment.

FIG. 3 illustrates modular marking system 120, a particular embodiment of the system 20 being used to capture data from a first identifier in the form of image 100 on surface 36 of article 102 and to subsequently print a second image 104 upon surface 36 of article 102. Article 102 comprises a three-dimensional article having a face or surface 36 including image 100 and also have an area upon which a second image 104 is to be printed. Article 102 has a thickness T, substantially perpendicular to surface 36. In one embodiment, article 102 may comprise a product. In another embodiment, article 102 may comprise packaging about an object. In other embodiments, article 102 may be a thinner article, such as an envelope, label or tag. As shown by FIG. 2, system 120 is able to sense and capture a first image 100 and print a second distinct image 104 on three-dimensional articles 102 potentially having a wide range of thicknesses since unit 130 is configured to be manually repositioned and moved relative to article 102. In other words, article 102 may be printed upon without article 102 being moved between a pair of rollers.

System 120 includes mounting module 24, power supply 26 (shown in FIG. 1), mounting system 28 (shown in FIG. 1) and unit 130. Unit 130 is similar to unit 30 in that unit 130 includes identifying sensor 58, communication interface 60, marking device 62, ready indicators 64, user interface 65, print sensor 66, auto sensor 68 and controller 74, each of which is illustrated and described above with respect to FIG. 1. As shown by FIG. 3, unit 130 is specifically configured such that marking device 62 is supported and located between base 45 and identifying sensor 58. As a result, identifying sensor 58 may perform a print quality check function, sensing the second image 104 after it has been printed to ensure satisfactory print quality.

FIG. 3 illustrates manual movement of system 120 and unit 130 across surface 36 of article 102. In the example illustrated, unit 130 is illustrated as being moved in a substantially continuous uninterrupted single movement relative to surface 36 (the substrate) in one direction along a linear path 108, substantially parallel to surface 36. FIG. 3 illustrates unit 130 moved across surface 36 from position 110 to position 112. At position 110, unit 130 is moved along path 108 across first image 100. During such movement, identifying sensor 58 is capturing data from image 100 and transmitting the data to controller 74 (shown in FIG. 1). As noted above, the initiation of data capture may be automatic in response to signals received from auto sensor 68.

At position 112, marking device 62 is ejecting printing material (e.g, ink) onto surface 36 to form a second distinct image 104. As noted above, the initiation of such printing may be in response to signals received from controller 74 that are based upon and in response to signals received from print sensor 66. The image 104 being printed is based upon the data captured from image 100. For example, in one embodiment, image 100 may comprise a product or article identification image, such as a barcode and the like. Based upon this information, image 104 is printed. Image 104 may comprise additional information regarding the article, such as a price, an expiration date, a shipping destination, or other information.

At the position 112, identifying sensor 58 is also being moved across and relative to the printed image 104. In one embodiment, identifying sensor 58 may sense image 104 to provide closed loop feedback regarding print quality, enabling controller 74 to make adjustments to enhance subsequent printing. In other embodiments, second image 104 may be analyzed to provide the user with an indication of whether or not image 104 should be reprinted or whether the image 104 has sufficient quality. In yet other embodiments, identifying sensor 58 may be in a non-operative state as it is being manually moved across the printed second distinct image 104.

As shown by FIG. 3, unit 130 is configured to be moved across surface 36 in a single uninterrupted movement in one direction along a linear path 108. During a single uninterrupted movement, image 100 is captured from surface 36. In addition, the second distinct image 104 is printed on surface 36 based upon information garnered from the sensed image or data from image 100. Because both actions are performed in a single uninterrupted movement across surface 36, article identification and subsequent labeling or printing efficiency is enhanced.

Figure 4:
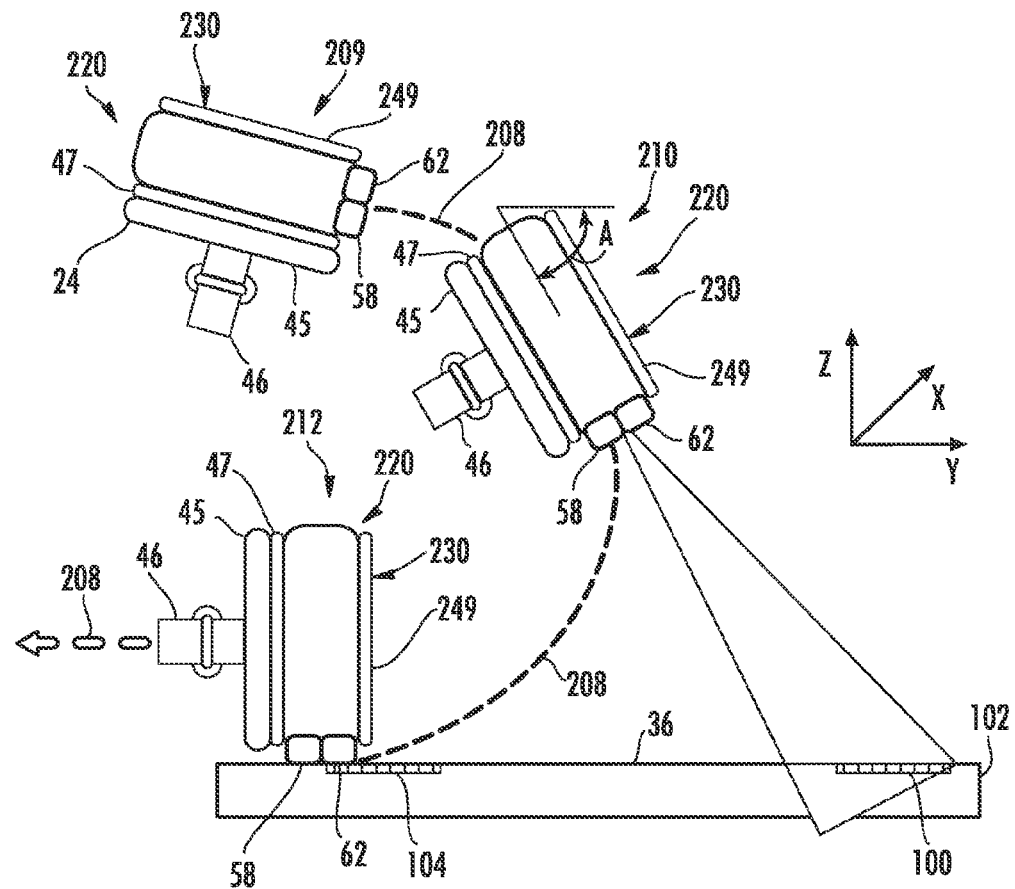
FIG. 4 is a side elevational view illustrating the system of FIG. 3 during data capture and printing according to an example embodiment.

FIG. 4 is a side elevational view of data identifying and printing system 220, a particular embodiment of system 20. Like a system 20, system 220 includes power supply 26 (shown in FIG. 1), mounting system 28 (shown in FIG. 1). However, unlike system 20, system 220 includes data identifying and printing unit 230 in lieu of unit 30. Unit 230 is similar to unit 30 in that unit 230 includes identifying sensor 58, communication interface 60, marking device 62, ready indicators 64, user interface 65, print sensor 66, auto sensor 68 and controller 74, each of which is illustrated and described above with respect to FIG. 1. Unit 230 is specifically configured such that identifying sensor 58 is supported and located between base 45 and marking device 62. Identifying sensor 58 leads marking device 62 during movement of unit 230 across a surface being scanned and printed upon. In particular, identifying sensor 58 is moved across a location on surface 36 prior to movement of marking device 62 across the same location. Because identifying sensor 58 is located upstream a marking device 62 during movement of unit 230, fogging of the identifying sensor 58 from over spray of printing material from marking device 62 is reduced.

As shown in FIG. 4, in one embodiment, casing 51 may additionally include tongues 249 on an opposite side of casing 51 proximate to marking device 62. Alternatively, and those embodiment in which base 45 includes tongues 249, the other side of casing 51 may include grooves 47. In yet other embodiments, the other side of casing 51 may include other releasable coupling structures for facilitating releasable connection of unit 230 and base 45 of mounting system 24. In such an embodiment, unit 230 may be mounted to based 45 and a reverse fashion as that shown in FIG. 4 such that marking device 62 is between base 45 and identifying sensor 58. As a result, identifying sensor 58 may be used for quality verification as described above with respect to FIG. 3. Permitting unit 230 to be mounted to base 245 in such opposite orientations provides enhanced flexibility.

FIG. 4 illustrates manual movement of system 220 and unit 230 across surface 36 of article 102. In the example illustrated, unit 230 is illustrated as being moved in a substantially continuous uninterrupted single movement relative to surface 36 (the substrate) in one direction along an arcuate path 208. FIG. 4 illustrates unit 230 being moved from position 209 to position 210 and subsequently to position 212 in a continuous on-air opted motion and substantially one direction along path 208. At position 209, unit 230 is in a pause mode, wherein neither image capture nor printing as then initiated. In one embodiment, unit 230 may be polling auto sensor 68 (shown in FIG. 1) to detect the image or identifier separation distance. In another embodiment, unit 230 may begin polling with auto sensor 68 in response to a manual trigger or other trigger event.

As shown in FIG. 4, at position 210, identifying sensor 58 is capturing data from image 100 and transmitting the data to controller 74 (shown in FIG. 1). As noted above, the initiation of data capture may be automatic in response to signals received from auto sensor 68 based upon the tilt angle of the unit 230 such as the tilt angle A illustrated at position 210 along arcuate path 208 during which unit 230 is tilted.

At position 212, marking device 62 is ejecting printing material or ink onto surface 36 to form a second distinct image 104. As noted above, the initiation of such printing may be in response to signals received from controller 74 that are based upon and in response to signals received from print sensor 66. The image 104 being printed is based upon the data captured from image 100. For example, in one embodiment, image 100 may comprise a product or article identification image, such as a barcode and the like. Based upon this information, image 104 is printed. For example, image 104 may comprise additional information regarding the article, such as a price, and expiration date, a shipping destination, or other information.

At the position 212, identifying sensor 58 is also being moved across and relative to article 102 ahead of marking device 62. As a result, identifying sensor 58 is continued to be moved away from any missed or spray created by marking device 62. Consequently, the window, lens or other optics of identifying sensor 58 are less clouded or contaminated from the mist of printing material from marking device 62.

As shown by FIG. 2, unit 230 is configured to be moved across surface 36 in a single uninterrupted movement in one direction along an arcuate path 208. During a single uninterrupted movement, image 100 is captured from surface 36. In addition, the second distinct image 104 is printed on surface 36 based upon information garnered from the sensed image or data from image 100. Because both actions are performed in a single uninterrupted movement across surface 36, article identification and subsequent marking or printing efficiency is enhanced.

In other embodiments, system 220 may capture identifying information from identifier image 100 (or another form of an identifier) and may subsequently print image 104 while being moved in a different fashion with respect to identifier image 100 and surface 36. For example, in one embodiment, at position 210, unit 230 may be paused while identifying information is captured or sensed from image 100. In one embodiment, between positions 210 and 212, unit 230 may be moved in an orthogonal direction. For example, unit 230 may be moved in a sideways direction in either direction along the Y axis before resuming movement of unit 230 in the arc shown toward surface 36. In another embodiment, unit 230 may be moved in a sideways direction in either direction along the X-axis (into or out of the drawing sheet of FIG. 4) before resuming movement of unit 230 toward surface 36 in the arc shown.

Figure 5:
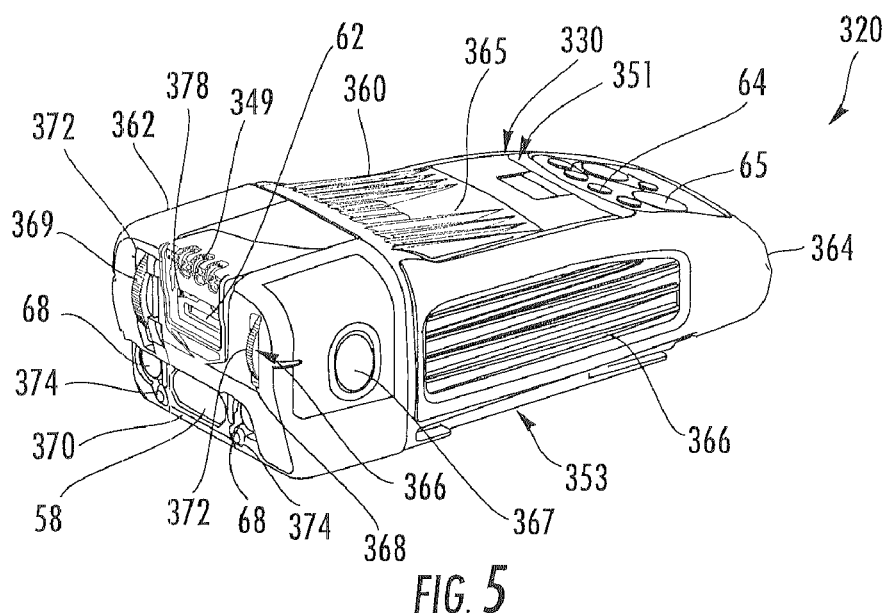
FIG. 5 is a top perspective view of a unit of another embodiment of the system of FIG. 1 according to an example embodiment.
Figure 6:
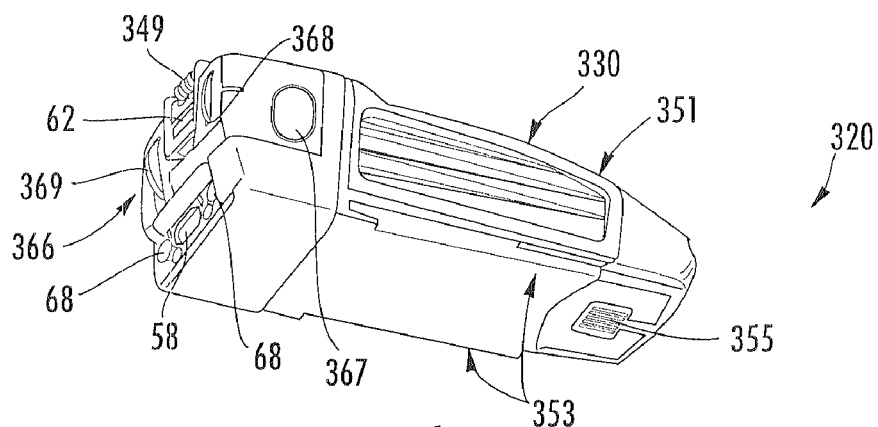
FIG. 6 is a bottom perspective view of the unit of FIG. 5 according to an example embodiment.
Figure 7:
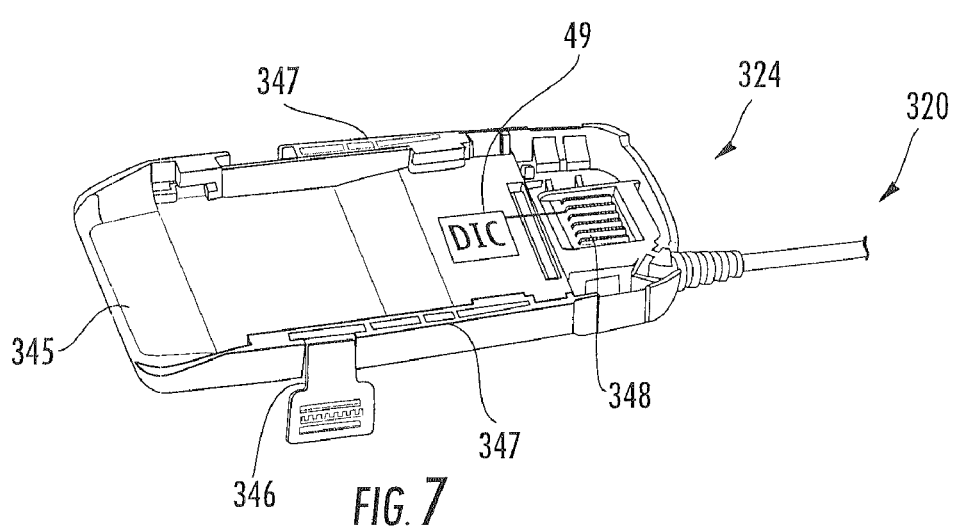
FIG. 7 is a top plan view of a mounting system according to an example embodiment.

FIGS. 5-7 illustrate data identifying and printing system 320, another embodiment of system 20. System 320 includes mounting module 324, power supply 26 (shown in FIG. 1), mounting system 28 (shown in FIG. 1) and data capture and print unit 330. FIGS. 5 and 6 illustrate data identifying and print unit 330. FIG. 7 illustrates mounting module 324. As shown by FIGS. 5 and 6, unit 330 is similar to unit 30 in FIG. 1 in that unit 330 includes identifying sensor 58, communication interface 60 (shown in FIG. 1), marking device 62, ready indicators 64, user interface 65, auto sensor 68 and controller 74 (shown in FIG. 1), each of which is described above with respect to unit 30. Unit 330 specifically includes print sensor 366 in place of print sensor 66.

Print sensor 366 comprises a sensing device configured to detect relative movement of the print unit 330, and in particular, marking device 62, relative to a surface being printed upon. Signals from print sensor 366 indicate the relative speed at which a device 62 is moving relative to the surface being printed upon or vice versa. Signals from print sensor 366 are used by controller 74 (shown in FIG. 1) to control the rate at which printing material is discharged from a device 62. In the particular embodiment illustrated, print sensor 366 is further configured to indicate contact or sufficiently close proximity of marking device 62 to the surface for the initiation of printing. In other embodiments, the initiation of printing may alternatively begin in response to actuation of a separate manual trigger 367.

In the example embodiment illustrated, print sensor 366 comprises an encoder wheel 368 which is rotated along the surface being printed upon. In the embodiment illustrated, unit 330 additionally includes idler wheel 369 which is rotationally supported on opposite sides of print device as encoder wheel 368. Idler wheel 369 projects forward a distance substantially equal to the distance at which encoder wheel 368 projects forwardly. Idler wheel 369 permits unit 330 to be rolled along a surface during printing while maintaining a level or parallel orientation with respect to the surface.

As shown by FIG. 5, unit 330 additionally includes tracking wheels 349, housing 351, attachment interface 353 and power/communication interface 355. Tracking wheels 349 comprise one or more wheels, discs, rollers or the like rotationally supported by housing 351 proximate to marking device 62 and configured to frictionally engage or grip the surface to be scanned and/or printed upon. Wheels 349 facilitate controlled movement of unit 330 relative to the surface being scanned and/or printed upon by inhibiting or reducing the likelihood of slippage as unit 330 is moved across the surface. In the embodiment illustrated, wheels 349 comprise three spaced star wheels having one or more pointed protrusions. In other embodiments, wheels 349 may include greater or fewer of such wheels and may comprise other rotatable structures having high friction circumferential surfaces which grip the surface.

Housing 351 comprises a structure or case configured to support the remaining components of the identifying and print unit 330. Housing 351 at least partially encloses or houses such components. In the embodiment illustrated, housing 351 is configured such that identifying and print unit 330 may be a hand held unit, enabling unit 330 to be grasped by a person's hand with a person's fingers wrapped about housing 351. In the particular embodiment illustrated, housing 351 includes central portion 360, head portion 362 and tail portion 364. Central portion 360 is formed from a thermally conductive material, such as a metal like magnesium, to enhance cooling of internal components of identifying and print unit 330. In one embodiment, central portion 360 includes a multitude of thermally conductive fins 365 providing an enlarged surface area for dissipating heat. In other embodiments, central portion 360 may fall from other materials and may have other configurations.

Head portion 362 extends at a front or forward end of housing 351 and includes openings by which components of unit 330 interact with the surface being scanned and/or printed upon. As shown by FIG. 5, head portion 362 includes window 370 for identifying sensor 58, windows 372 for encoder wheel 368 and idler wheel 369 of print sensor 366, windows 374 for auto sensor 68 and window 378 for marking device 62. In the particular example illustrated, communication interface 60 includes antenna (not shown) located within head portion 362. In such an embodiment, head portion 362 is formed from one or more non-metallic materials facilitating transmission of signals from the antenna of communication interface 60.

Tail portion 364 extends at a back or rear end of unit 330 and contains or supports ready indicators 64 and user interface 65. In other embodiments, indicators 64 and user interface 65 may be located at other regions of unit 330.

Attachment interface 353 comprises a structure configured to releasably attach unit 330 to mounting module 324. As shown by FIG. 6, in the embodiment shown, attachment interface 353 includes a pair of female grooves extending along opposite sides of central portion 360 of housing 351. In other embodiments, attachment interface 353 may comprise other structures configured to cooperate with mounting module 324 to releasably connect and secure unit 330 to mounting module 324. For example, although attachment interface 353 is illustrated as an attachment structure configured to facilitate releasable interconnection of unit 330 and mounting module 324 without the use of tools, in other embodiments, attachment interface 353 may alternatively utilize tools for securement of unit 330 to mounting module 324.

Power/communications interface 355 comprises an interface configured to facilitate electrical (or optical) connection between unit 330 and a corresponding interface associated with mounting module 324. Interface 355 facilitates transmission of power and/or communication signals to unit 330 through mounting module 324. In the example illustrated, interface 355 comprises an array of male pin electrical interconnects configured to mate with corresponding female pin interconnects on mounting module 324 or other add-on modules. In other embodiments, interface 355 may have other configurations facilitating transmission of power and/or communication signals. In other embodiments, interface 355 may be omitted.

FIG. 7 illustrates mounting module 324. As shown by FIG. 7, mounting module 324 includes base 345, strap 346, attachment interface 347 and power/communication interface 348 and digital identification code 49 as schematically illustrated in FIG. 7 and described above with respect to FIG. 2. Base 345 comprises a floor, platform, shelf or panel configured to support unit 330 on a back of a hand of a user. Strap 346 comprises one or more members configured to extend from unit 330 and to wrap about the hand. For example, in one embodiment, strap 346 may have opposite ends releasably connected to one another by a hook and loop fastener (VELCRO). In another embodiment, such ends may be releasably connected to one another by snaps, clasps, buckles and the like.

In the embodiment illustrated, mounting module 324 extends about substantially an entire width of a hand. In the embodiment illustrated, mounting module 324 extends about all four fingers of a hand. In yet other embodiments, mounting module 324 may extend about fewer of such fingers or a smaller portion of a hand. For example, in other embodiments, mounting module 324 may extend about a person's middle finger and index finger. In other embodiments, mounting module 324 may extend about a person's middle finger, index finger and ring finger. In other embodiments, mounting module 324 may alternatively extend over a hand and be substantially received between the person's wrist and knuckles.

Attachment interface 347 includes a pair of male projections or tongues extending along opposite sides of base 345. In other embodiments, attachment interface 347 may comprise other structures configured to cooperate with unit 330 to releasably connect and secure unit 330 to mounting module 324. For example, although attachment interface 347 is illustrated as an attachment structure configured to facilitate releasable interconnection without the use of tools, in other embodiments, attachment interface 347 may alternatively utilize tools for securement of unit 330 to mounting module 324.

Power/communications interface 348 comprises an interface configured to facilitate electrical (or optical) connection to interface 355 of unit 330. Interface facilitates the reading of the transmission of digital identification code 49. In one embodiment, digital identities for 49 may be embodied as a memory or other form of persistent storage associated with module number 324. In yet other embodiments, digital identification code 49 may comprise one or more switches or electoral shorts provided in interface 348.

In addition to transmitting digital identification code 49, interface 348 further facilitates transmission of power from power supply 26 (shown in FIG. 1) through mounting module 324 to unit 330. In the example illustrated, interface 348 comprises an array of female pin receptacle, electrical interconnects configured to mate with corresponding male pin interconnects of interface 355. In other embodiments, interface 348 may have other configurations facilitating transmission of power and/or communication signals. In other embodiments, interface 348 may be omitted.

Like units 30, 130 and 230, unit 330 is configured to be moved relative to a surface in a single uninterrupted movement in one direction along a linear or arcuate path. During such movement, the first identifier is sensed or captured and a second distinct image is printed based upon the first identifier. As with units 30, 130 and 230, unit 330 is configured to initiate the capturing of data from the first identifier and to also initiate printing of a second distinct image based upon the captured first identifier in response to no greater than one manual triggering event. As a result, information capture and printing efficiency may be enhanced.

Figure 8:
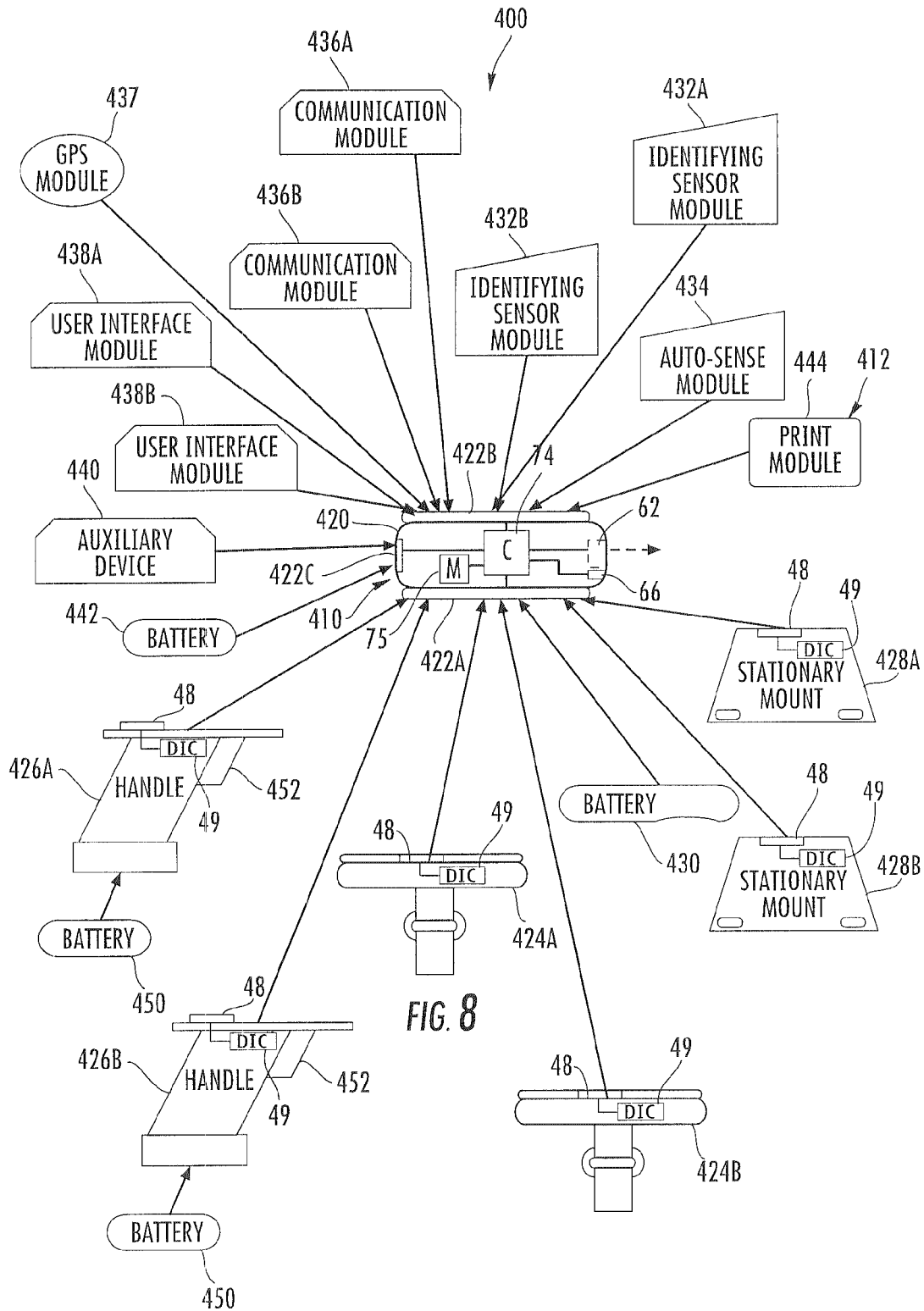
FIG. 8 is a schematic diagram of a modular system according to an example embodiment.

FIG. 8 schematically illustrates modular marking system 400 according to an example embodiment. System 400 comprises a central print module 410 and a multitude of accessory modules 412 that may be releasably mounted to central module 410 to form a customized unit. Print module 410 includes housing 420, marking device 62, print sensor 66, controller 74 and connection interfaces 422A, 422B, 422C (collectively referred to as connection interfaces 422). Housing 420 comprises a body, case or other structure or structures configured to at least partially enclose and support components of module 410. In the particular example illustrated, housing 420 is configured such that module 410 may be held by a person's hand by the person's fingers and thumb. In other embodiments, housing 420 may have other configurations.

Marking device 62, print sensor 66 and controller 74 are described above with respect to unit 30 and FIG. 1. Marking device 62 comprises a device configured to eject printing material, such as ink, onto a surface. Print sensor 66 comprises a device configured to sense relative movement of module 410 relative to a surface being printed upon. Like units 30, 130, 230 and 330, module 410 is configured to be manually moved relative to the surface being printed upon or while the system is held or mounted in a stationary fashion as the surface being printed upon is moved relative to and external to module 410. Like such units, module 410 is also configured to print upon a surface of a three-dimensional article, such as article 102 (shown in FIG. 2. Module 410 may be raised and lowered with respect to the surface being printed upon even during such printing. In one embodiment, such movement disengages print sensor 66 such that printing is interrupted or terminated. Because module 410 is configured to print upon media without the media being driven by module 410, module 410 may print upon surfaces that are three dimensional in nature or have enlarged thicknesses such as media having a thickness of at least about 0.5 inches. Module 410 may also print on thin media having lesser thicknesses. In other embodiments, module 410 may alternatively be configured to additionally drive the media. Controller 74 receives signals from print sensor 66 and generates control signals directing the printing by marking device 62. Controller 74 is further configured to receive signals via attachment interfaces 422.

Connection interfaces 422 comprise structures configured to facilitate physical or mechanical attachment of modules 412 to module 410. With particular modules 412, connection interfaces 422 are further configured to facilitate transmission of power and/or communication signals between such accessory modules 412 and print module 410. As a result, print module 410 may be upgraded as desired to satisfy different applications or to provide different capabilities.

In one embodiment, interface 422A and 422B include rail or latch features facilitating physical or mechanical connection of accessory modules 412. Such connection results in the accessory modules being mounted to and physically moving with module 410 in substantial unison. Examples of such features include, but are not limited to, a slide-on mechanical interface including tongue and grooves, a similar tilt-on arrangement or a clamp-on system such as a 1913 Picatinny rail system. Interface 422A and 422B additionally include sets of electrical contacts, such as electrically conductive pins, pads or receptacles configured make individual electrical interconnection with corresponding electrical contacts or interconnects of an opposite accessory module 412. Each interface 422 may be configured to alternately or concurrently be connected to multiple accessory modules 412.

Interface 422C is configured to provide electrical interconnection to selected accessory modules 412. For example, interface 422C may comprise an electrical port or plug by which particular accessory modules 412 may be connected without being physically supported by module 410. For example, module 410 may be connected to such particular accessory modules 412 by cable or plug. In other embodiments, interface 422C may alternatively be additionally configured to physically connect and support accessory modules.

Each of modules 412 include a communication interface 48 and a digital identification code 49 (schematically illustrated in some of modules 412 in FIG. 8) and described above with respect to system 20. For example, in one embodiment, each module 412 includes a digital identification code 49 having a coding/ID scheme as described above. As a result, each digital identification code 49 identifies itself to central module 410, permitting controller 74 of central module 410 to appropriately configure itself to use the features provided by the one or more connected accessory modules 412. In the example illustrated, the digital identification code 49 of each accessory module 412 additionally indicates a particular user associated with the accessory module 412, provides authorization access for accessing an external data source or network, provides or addresses preferences for a particular user and/or preferences for a particular task or project to be performed by the one or more accessory modules 412. In other embodiments, the one or more digital identification codes 49 may provide less than all of the feature or customization identifiers.

In the example illustrated, accessory modules 412 include hand mounting system module 424A and hand mounting system module 424B (collectively referred to as hand mounting system modules 424), handle module 426A and handle module 426B (collectively referred to as handle modules 426), stationary mount module 428, battery handle module 430, identifying sensor modules 432A and 432B (collectively referred to as modules 432), auto sense module 434, communication modules 436A and 436B (collectively referred to as communication modules 436), GPS module 437, user interface module 438, auxiliary device module 440 and battery module 442. Hand mounting system modules 424 are substantially similar to mounting system 224 described above with respect to FIG. 3. Hand mounting system modules 424, when connected to module 410, enable print module 410 to be supported on a back of a hand of a user, freeing the hand for additional tasks while supporting print module 410 and any additional accessory modules 412 that may also be attached to print module 410.

Hand mounting system modules 424A and 424B are substantially similar to one another except that modules 424A and 424B include distinct digital identification codes 49. In one embodiment, module 424A has a digital identification code 49 indicating a first set of one or more ergonomic preferences for a first user while module 424B has a second distinct set of one or more ergonomic preferences, such as a tilt angle for initiating sensing when module 432 is also mounted to module 410, for a second user. The digital identification code 49 of module 424A provides the first user with access to a first network or database while the digital identification code 49 of module 424B provides the second user with access to a second distinct network or database.

Handle modules 426 each comprise a handle configured to be mounted to print module 410. Modules 426 provide module 410 with a handgun-like grip. As shown by FIG. 8, module 426 may additionally provide a battery 450 and a trigger 452, wherein the trigger may be used to initiate printing by marking device 62 or to initiate other actions by other accessory modules 412 that may be in communication with a connected to print module 410. Handle modules 426A and 426B are substantially similar to one another except that modules 426A and 426B include distinct digital identification codes 49. In one embodiment, module 426A has a digital identification code 49 indicating a first step of one or more ergonomic preferences for a first user while module 426B has a second distinct set of one or more ergonomic preferences, such as a tilt angle for initiating sensing when module 432 is also mounted to module 410, for a second user. The digital identification code 49 of module 426A provides the first user with access to a first network or database while the digital identification code 49 of module 426B provides the second user with access to a second distinct network or database.

Stationary mount modules 428 each comprise a structure configured to be connected to print module 410 used support module 410 in a stationary manner. For example, stationary mount modules 428 may be configured to support module 410 in a stationary manner with respect to articles being moved by a conveyor or other transport. In one embodiment, stationary mount modules 428 may be connected and configured so as to communicate with controller 74 of module 410, permitting print module 410 to be externally controlled via signals transmitted from stationary mount module 428 to module 410. Stationary mount modules 428A and 428B are substantially similar to one another except that modules 428A and 428B include distinct digital identification codes 49. In one embodiment, module 428A has a digital identification code 49 indicating a first operational parameter for the first mounting location or workstation while module 428B has a distinct digital identification code 49 indicating a second operational parameter for a second mounting location or workstation.

Battery handle module 430 comprises a battery enclosed in a casing that is contoured to be held in a user's hand. Module 430 may be configured to provide a more ergonomic grip for module 410 while additionally providing a source of power.

Identifying sensor modules 432 comprises a self-contained module including an identifying sensor, such as identifying sensor 58 described above with respect to FIG. 1. Identifying sensor modules 432A and 432B comprise distinct sensor modules. For example, in one embodiment, module 424A may comprise a CCD scanner module while module 424B may comprise a laser scanner. Modules 424 have distinct digital identification codes with distinct identifiers. For example, when the digital identification codes 49 employed the coding such ID scheme described above, each of modules 432 may include distinct type classification bits.

Auto sense module 434 comprises self-contained module including a component of figure to sense distance separating print module 410 and a surface being printed upon. For example, auto sense module 434 may include auto sensor 68 described above with respect to FIG. 1.

Combining print module 410, identifying sensor module 432 and auto sense module 434 may result in a unit configured to perform the functions described above with respect to units 30, 130, 230 and 330. In particular, the formed unit may be configured to capture or sense a first identifier and to print a second distinct image based upon the first identifier during movement of the formed module in a single uninterrupted movement in one direction along a linear or arcuate path. Such image or identifier capture or sensing and such printing may be initiated in response to no greater than one manual triggering event, initiating such actions using one or both of print sensor 66 and auto sense module 434. Further adding hand mounting system module 424 allows be formed unit to additionally be mounted on a back of a hand of a user similar to the supporting of units 30, 130, 230 and 330.

Communication modules 436 each comprise a self-contained module including a communication interface component such as an indication interface 60 described above with respect to FIG. 1. Modules number 436 comprises distinct types of communication modules. For example, in one embodiment, module 436A may comprise a USB type output module while module 436B may comprise wireless type output module. Modules 436 have distinct digital identification codes with distinct identifiers. For example, when the digital identification codes 49 employed the coding such ID scheme described above, each of modules 432 may include distinct type classification bits.

User interface modules 438 each comprise a self-contained module including a user interface component, such as user interface 65, described above with respect to FIG. 1. With the addition of modules 436, print module 410 may receive instructions or commands from external devices. The addition of module 438 may provide enhanced control over print module 410 and any attached accessory modules 412. In one embodiment, modules 438 substantially similar to one another except that modules 438 include distinct digital identification codes 49. In one embodiment, the distinct identification codes 49 include different interface settings or parameters. For example, user interface module 438A may instruct controller 74 of module 410 to perform a first function or respond in a first way in response to depressment of a button of user interface module 438A. At the same time, digital identification code 49 of module 438B may instruct controller 74 to perform an entirely different second function or respond in an entirely different second way in response to depressment of the same button. Such different responses or control settings may be set according to a user's particular preferences or as desired in different workstation environments.

Global Positioning System (GPS) module 437 comprises a self-contained module including a GPS communication system configured to make communication with one or more satellites and to derive a current location of print module 410. Module 437 transmits such location or geographic data to controller 74. In particular modes, controller 74 may be configured to print one or more forms of the geographic data onto a print media. In yet another embodiment, controller 74 may print any image or data based upon the information data. For example, controller 74 may consult a look-up table in memory 75 having predefined images that are to be printed in response to controller 74 receiving selected information data. For instance, when unit 410 is that a first location, a first image is printed and when unit 410 is at a second location, a second distinct image is printed.

Auxiliary device module 440 comprises a separate device or component connected to module 410 so as to be in communication with module 410. Example of such an auxiliary device include, but are not limited to, supplemental support for module 410 such as additional processing or memory capability. Battery module 442 comprises a module containing a battery which is connected to print module 410. For example, battery module 442 may comprise power supply 26 and mounting system 28 described above with respect to FIG. 1.

Print module 444 comprises a self-contained module including an additional print device. For example, print module 444 may comprise additional print heads for ejecting printing materials or inks distinct from the ink ejected by marking device 62. For example, print module 444 may be configured to eject different colors of ink as compared to marking device 62. In yet another embodiment, print module 444 may comprise an enlarged reservoir for supply containing printing material or ink for marking device 62.

In the particular example illustrated, each of accessory modules 412 includes a connection interface configured to cooperate with one or more of connection interfaces 422. Upon connection, accessory modules 412 may move in substantial unison with print module 410 as a result of the connection. Each accessory module 412 may receive and transmit communications signals through the interface. In particular embodiments, accessory modules 412 may additionally be configured to be physically connected to and supported relative to other modules while being connected to such other modules so as to communicate with the other modules directly or across print module 410. For example, in some embodiments, one accessory module 412 may be configured to be releasably connected to another accessory module 412 which is itself connected to print module 410. In such a manner, modules 412 may be physically stacked on to print module 410.

Overall, system 400 permits a base printing module 410 to be upgraded as desired. Module 410 may be upgraded to form a unit capable of performing one or more of the functions of data capture and print units 30, 130, 230 and 330 described above. As a result, print module 410 may be upgraded to provide enhanced data capture and printing efficiency. In addition, system 400 may utilize digital identification codes 49 such that central module 410 may configure itself based upon what particular accessory module 412 is mounted to it. As a result, customizing central module 410 and any accessory module 412 to a particular user or to a particular task is simpler and less time-consuming Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An apparatus comprising:
   a unit having a stationary marking device and a first communication interface, the unit being configured to be manually moved relative to a surface being printed upon by the unit during printing and to alternatively be held stationary along with the marking device as the surface being printed upon is moved relative to and external to the unit, wherein the unit includes a controller; and
   a first module releasably connected to the unit, the first module comprising one of a handle configured to provide a handgun-like grip, a hand mount configured to mount the unit on the back of a person's hand or a stationary mount configured to support the unit in a stationary position, the first module having a second communication interface connected to the first communication interface, wherein the first module includes at least one first digital identification code, wherein the controller generates control signals based on the at least one first digital identification code, wherein the at least one first digital identification code has a first assigned value associated with a customized setting for a first user or a first job for a function performed by the unit.

2. The apparatus of claim 1, wherein the unit includes a third communication interface and wherein the apparatus further comprises a second module releasably connected to the unit, the second module having a fourth communication interface.

3. The apparatus of claim 2, wherein the second module includes at least one second digital identification code different than the at least one first digital identification code, wherein the controller generates control signals based on the at least one second digital identification code.

4. The apparatus of claim 1, wherein the unit includes an identifying sensor configured to capture data from an identifier on the surface or another surface, wherein the at least one first digital identification code includes (1) a first tilt angle of the unit for the identifying sensor to initiate capture of data when the first module comprises a hand mount as indicated by the at least one first digital identification code and wherein the at least one first digital identification code includes a second tilt angle of the unit for the identifying sensor to initiate capture of data when the first module comprises a handle as indicated by the at least one first digital identification code.

5. The apparatus of claim 1 wherein the unit includes an identifying sensor configured to capture data from an identifier on the surface or another surface, wherein the first module comprises a first hand mount, and wherein the apparatus further comprises a second module comprising a second hand mount including at least one second digital identification code having a second assigned value associated with a second user, wherein the controller generates control signals to initiate the sensor at a first tilt angle of the unit based upon the first assigned value when the first module is connected to the unit and wherein the controller generates control signals to initiate the sensor at a second tilt angle of the unit based upon the second assigned value when the second module is connected to the unit.

6. The apparatus of claim 1, wherein the customized setting comprises one or more of a tilt angle of the unit to initiate sensing, aiming light on/off, aiming light type, identifying sensor illumination on/off, identifying sensor illumination type, code capture length, symbology type, data capture range, feedback parameters and identifier type.

7. The apparatus of claim 1, wherein the first assigned value comprises an address for a source external the module for the customized setting.

8. The apparatus of claim 1, wherein the at least one first digital identification code includes an authorization key for accessing an external data source.

9. The apparatus of claim 8, wherein the authorization is for accessing an external data source that is external to the unit and the first module.

10. The apparatus of claim 1, wherein the at least one first digital identification code identifies at least one of a class of the first module, a type of the first module and at least one feature of the first module.

11. The apparatus of claim 10, wherein the class includes one of input, mounting and output classifications.

12. The apparatus of claim 1, wherein the at least one first digital identification code includes a user identification identifying a person to which the module is assigned.

13. The apparatus of claim 1, wherein the unit includes an identifying sensor configured to capture data from a surface external to the apparatus and wherein the stationary marking device and the identifying sensor are on a same face of the unit.

14. An apparatus comprising:
a unit comprising:
a marking device;
a first communication interface; and
a controller; and
a first module releasably connected to the unit, the first module comprising:
a second communication interface connected to the first communication interface; and
at least one first digital identification code associated with the first module, wherein the controller is configured to receive the first digital identification code via the first communication interface and the second communication interface and wherein the controller is configured to generate control signals based upon the first digital identification code, wherein the at least one first digital identification code has an assigned value associated with a customized setting for a particular person or a particular job assigned to the module, wherein the customized setting comprises one or more of a tilt angle to initiate sensing, aiming light on/off, aiming light type identifying sensor illumination on/off, identifying sensor illumination type, code capture length, symbology type, data capture range, feedback parameters and identifier type.

15. The apparatus of claim 14, wherein the unit includes an identifying sensor configured to capture data from an identifier on the surface or another surface, wherein the at least one first digital identification code includes a first tilt angle of the unit for the identifying sensor to initiate capture of data when the first module comprises a hand mount as indicated by the at least one first digital identification code and wherein the at least one first digital identification code includes a second tilt angle of the unit for the identifying sensor to initiate capture of data when the first module comprises a handle as indicated by the at least one first digital identification code.

16. The apparatus of claim 14, wherein the at least one first digital identification code has a first assigned value associated with customized settings for a particular person or a particular job assigned to the module.

17. The apparatus of claim 16, wherein the first assigned value comprises an address of a source external the module for the customized setting.

18. The apparatus of claim 14 wherein the unit includes a third communication interface, the apparatus further comprising a second module releasably connected to the unit, the second module comprising:
a fourth communication interface connected to the third communication interface; and
a second memory including a second digital identification code, wherein the controller is configured to receive the second digital identification code via the third communication interface and the fourth communication interface and wherein the controller is configured to generate control signals based upon the second digital identification code.

19. The apparatus of claim 14, wherein the at least one first digital identification code includes a user identification identifying a person associated with the module.

20. The apparatus of claim 14, wherein the at least one first digital identification code includes an authorization key for accessing an external data source that is external to the unit and the first module.

21. The apparatus of claim 14, wherein the unit includes an identifying sensor, wherein the at least one first digital identification code identifies a class of the first module, a type of the first module and at least one feature of the first module.

22. The apparatus of claim 21, wherein the class includes one of input, mounting and output classifications.

23. An apparatus comprising:
a unit having a stationary marking device and a first communication interface, the unit being configured to be manually moved relative to a surface being printed upon by the unit during printing and to alternatively be held stationary along with the marking device as the surface being printed upon is moved relative to and external to the unit, wherein the unit includes a controller;
a first module releasably connected to the unit, the first module having a second communication interface connected to the first communication interface, wherein the first module includes at least one first digital identification code, wherein the controller generates control signals based on the at least one first digital identification code; and
an identifying sensor, wherein the at least one first digital identification code includes a first tilt angle of the unit for the identifying sensor to initiate capture of data when the first module comprises a hand mount as indicated by the at least one first digital identification code and wherein the at least one first digital identification code includes a second tilt angle of the unit for the identifying sensor to initiate capture of data when the first module comprises a handle as indicated by the at least one first digital identification code.

24. The apparatus of claim 23, wherein the identifying sensor is configured to capture data from a surface external to the apparatus and wherein the stationary marking device and the identifying sensor are on a same face of the unit.

25. An apparatus comprising:

a unit configured to be manually moved relative to a surface being printed upon by the unit during printing and to alternatively be held stationary along with the marking device as the surface being printed upon is moved relative to and external to the unit, wherein the unit comprises:

a stationary marking device;

a first communication interface;

a controller; and an identifying sensor configured to capture data from a surface external to the apparatus and wherein the stationary marking device and the identifying sensor are on a same face of the unit; and a first module releasably connected to the unit, the first module comprising one of a handle configured to provide a handgun-like grip, a hand mount configured to mount the unit on the back of a person's hand or a stationary mount configured to support the unit in a stationary position, the first module having a second communication interface connected to the first communication interface, wherein the first module includes at least one first digital identification code, wherein the controller generates control signals based on the at least one first digital identification code, wherein the at least one first digital identification code includes a user identification identifying a person to which the module is assigned.

* * * * *